April 12, 1949.　　　　E. H. LAND　　　　2,467,320
PHOTOGRAPHIC APPARATUS FOR
PROCESSING FILM MATERIAL Filed Dec. 4, 1947　　　　　　　　　　　　2 Sheets-Sheet 1

INVENTOR
Edwin H. Land
BY
Donald L. Brown
Attorney

April 12, 1949.　　　　　E. H. LAND　　　　　2,467,320
PHOTOGRAPHIC APPARATUS FOR
PROCESSING FILM MATERIAL Filed Dec. 4, 1947　　　　　　　　　　　　2 Sheets-Sheet 2

INVENTOR
Edwin H. Land
BY Donald L. Brown
Attorney

Patented Apr. 12, 1949

2,467,320

UNITED STATES PATENT OFFICE 2,467,320

PHOTOGRAPHIC APPARATUS FOR
PROCESSING FILM MATERIAL

Edwin H. Land, Cambridge, Mass., assignor to Polaroid Corporation, Cambridge, Mass., a corporation of Delaware Original application May 31, 1946, Serial No. 673,404. Divided and this application December 4, 1947, Serial No. 789,714

12 Claims. (Cl. 95—13)

1

This invention relates to photographic apparatus and more particularly to apparatus incorporated with a camera for treating film material exposed therein.

This application is a division of my copending application bearing Serial No. 673,404, filed May 31, 1946.

An object of the present invention is to provide camera apparatus for subjecting exposed film materials to a processing treatment and for placing and holding the materials thereafter in a substantially light-tight compartment, the compartment being positionable with respect to other casing portions of the camera for rendering the apparatus compact for carrying and storage purposes.

Another object of the present invention is the provision of a suitable collapsible chamber mounted on external portions of the camera for receiving and holding film material which has been exposed and subjected to a processing treatment within the camera.

A further object of the present invention is to provide a substantially light-tight compartment for receiving film material ejected through an aperture in the casing of a camera, the compartment being so mounted upon the camera that it may be held at one position for receiving the film material and may be held at another position providing both an overall compactness of the apparatus and a frontal closure or casing portion for protecting the lens and bellows of the camera when the latter are not in use.

These and other objects of the invention will in part be obvious and will in part appear hereinafter.

The invention accordingly comprises the apparatus possessing the construction, combination of elements, and arrangement of parts which are exemplified in the apparatus hereinafter described, and the scope of the application of which will be indicated in the claims.

In the drawings, wherein like reference characters refer to like parts throughout the several views:

Fig. 3 is a front elevational view of elements of the novel camera apparatus in association with

Figure 1:
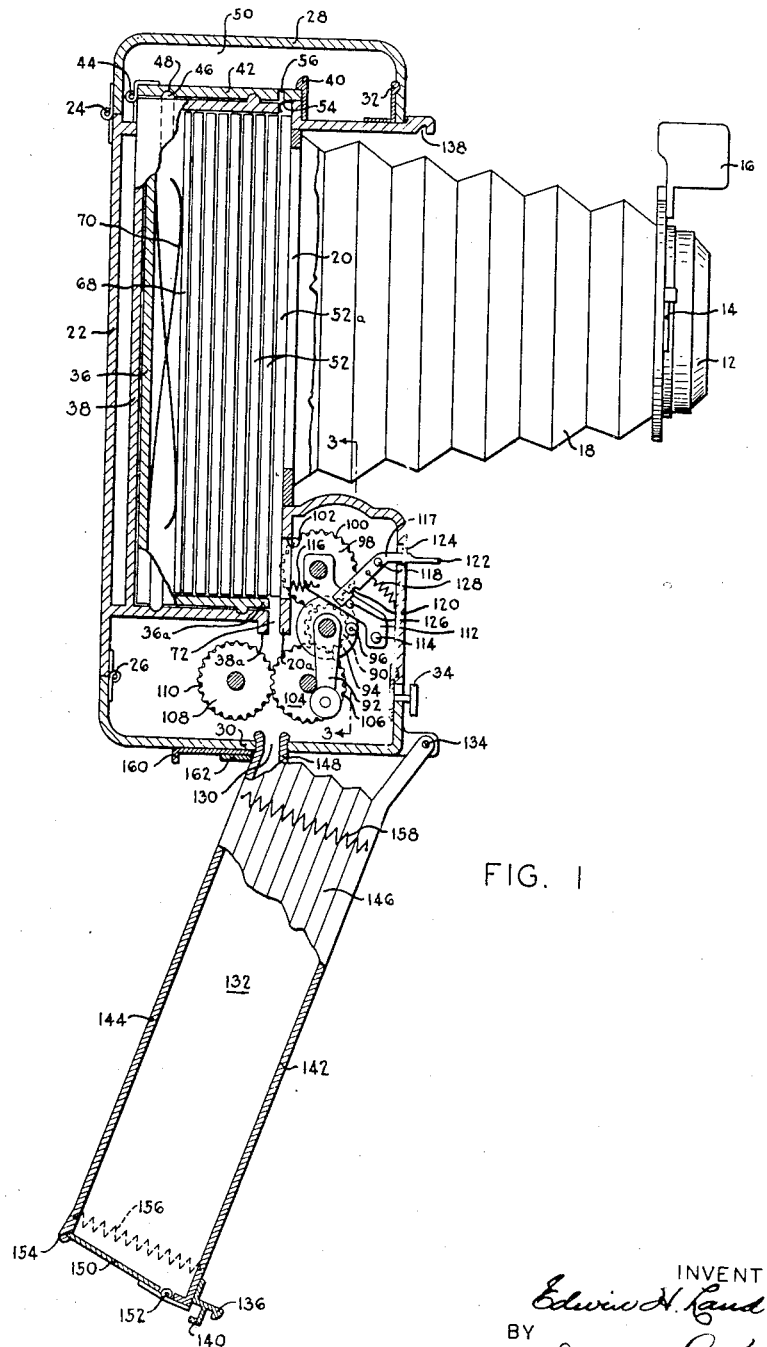
Figure 1 is an elevational view, partly in cross section and with parts broken away, of one form of the novel camera apparatus of the invention.

2 a suitable composite photographic film, along the line 3—3 of Fig. 1; and

Figure 4:
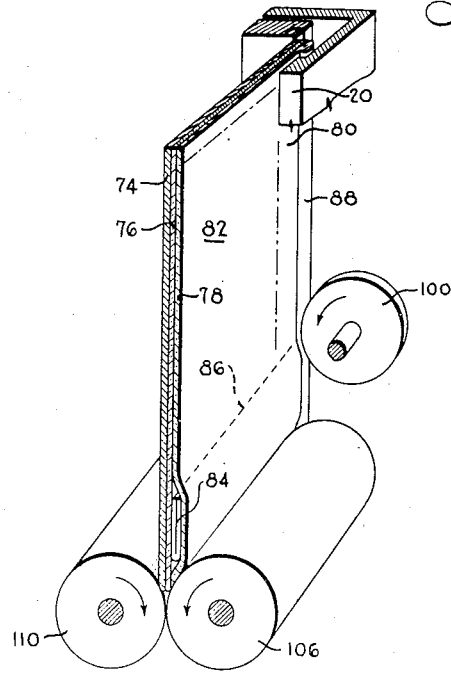

Fig. 4 is a schematic, fragmentary perspective view, partly in cross section, illustrating the operation of propulsive and compressive roller elements in conjunction with a composite photographic film material suitable for use in the camera apparatus.

Referring to Fig. 1, a somewhat schematic representation of the novel camera apparatus comprising the invention is shown, said apparatus being of suitable design for photographic exposure of a plurality of photographic film units, for processing said film units, for forming positive prints of the subject images thereof, and for removal of the completed prints from the camera apparatus for viewing said prints.

Camera elements illustrated comprise lens 12, having a suitable shutter, not shown, associated therewith, shutter release 14, view finder 16, bellows 18, and framing plate 20. A camera housing suitable for supporting and enclosing the apparatus and for preventing admittance of actinic light to photosensitive film material preferably comprises a plurality of wall portions forming a plurality of light-tight chambers for releasably holding a supply of the film units, for photographically exposing said units, and for processing said units after exposure thereof. In the form of camera apparatus shown in Fig. 1, wall portion 22 forms the principal housing of the camera. Pivotally attached thereto by hinge elements 24 and 26 are external wall portions 28 and 30, respectively, said portions providing means for access to the interior of the housing and having friction latch means 32 and locking latch 34, respectively, for releasably holding said portions in closed position. The inner constructions of the camera comprise a magazine 36 removably mountable in a magazine holder 38, access to the magazine holder being accomplished by releasing friction latch 32, swinging open wall portion 28 of the camera casing, releasing locking latch 40, and by swinging open pivotally mounted portion 42 of the magazine holder on hinge element 44. The magazine may then be inserted in the holder through the portions of the camera which have been opened as above described. Rib elements 46 extending along wall portions of the magazine are provided for engaging grooves 48 formed in adjacent portions of the magazine holder, said rib and groove components facilitating positive mounting of the magazine in the holder. The combination of pivotally mounted members 28 and 42 forming chamber 50 therebetween provides means for excluding actinic light from the interior of the magazine containing film units 52, said means being supplementary to light-shielding means 54 comprising a spring-like element attached to member 42 in such manner as to block aperture 56 when said member 42 is in closed position. Aperture 56 is of suitable dimensions for withdrawing therethrough a light shield of suitable form from frontal portions of the magazine after loading said magazine in the magazine holder, thus enabling the foremost film unit to be released and moved toward a position for photographic exposure thereof. It will be apparent that pivotally mounted casing portion 28 may be dispensed with in a modified design of the camera without materially affecting its operability, said portion serving as additional means for protecting photosensitive materials within the camera and providing a dust seal for aperture 56.

Figure 2:
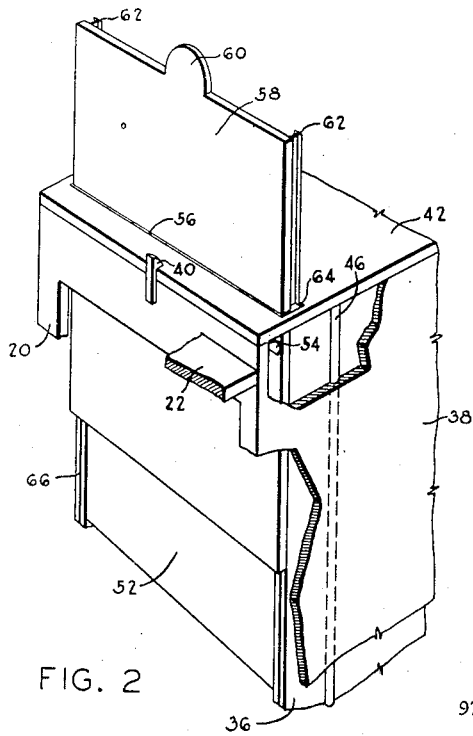
Fig. 2 is a somewhat schematic, fragmentary perspective view of elements of the film magazine and magazine holder and illustrates a method by which a form of film pack may be loaded in the camera.

A construction and relationship of elements of the magazine, magazine holder, and camera portions for mounting the magazine is more fully illustrated in Fig. 2, wherein is shown protective plate 58, constructed of sheet metal or other suitable material, and having tab portion 60, said tab being adapted to project through aperture 56 when door 42 is closed and, in said position, to provide means for withdrawing said plate 58 after loading the magazine in the magazine holder. Flange elements 62, projecting rearwardly from marginal portions of the plate, are adapted to engage similarly shaped slots 64 comprising extended portions of aperture 56 adjacent each end thereof, said slots coacting with grooves 66, and said grooves extending within and parallel to sidewall portions of magazine 36. The aforesaid aperture, slots, and grooves permit both the mounting of plate 58 on magazine 36 and its removal therefrom.

Film units 52 may be loaded in the magazine and cover 58 thereafter installed in a suitable darkroom, said loading operation being accomplished by inserting the first film unit through the open side of the magazine against pressure plate 68 tensioned by compression spring 70, and by thereafter loading the balance of film units in adjacent relationship to each other.

The loaded magazine may then be installed in the magazine holder and plate 58 removed therefrom, as above described. The foremost film unit 52a is thus adapted to release from the magazine, said release and the forward movement of all succeeding film units being actuated through the influence of compression spring 70 and said foremost film unit 52a being thus brought to framed position in contact with framing plate 20. It is to be noted in Fig. 1 that the distance between front or open edge portions of the magazine and framing plate 20 is slightly greater than the thickness of a film unit and that said dimension provides a space wherein said film unit may be held through frictional contact with a succeeding film unit in framed position for photographic exposure. It is further to be noted that an aperture 72 adjacent said framed film unit is provided by a plurality of elements comprising a front edge of the magazine 36a, an extended portion 38a of the magazine holder, and an extended portion 20a of the framing plate, said aperture likewise being of a width slightly exceeding that of the film unit and providing a passage through which said film unit may be guided after its photographic exposure.

A form of composite film unit suitable for use in the camera apparatus of the invention is shown in Fig. 4 and comprises an opaque base layer 74, a photosensitive layer 76, adhering to said base layer, and a layer 78 comprising a transparent, preferably cellulosic material suitable for carrying a photographic print. Layer 78 is preferably bonded to layer 76 along marginal portions 80 only, facing areas 82 of said layers lying between said marginal portions, defined within the broken line, being substantially superposed throughout but unbonded to one another and thereby being adapted to introduction and spreading of a fluid such as a photographic processing fluid therebetween. Facing areas 82 substantially comprise the photographic image portions of the composite film, namely, those portions adapted to processing and the formation therewithin or thereupon of a positive photographic print.

A collapsible container 84 enclosing a fluid of the aforesaid type and having means for directional release of said fluid as, for example, having a frangible seal along edge portions 86 thereof, is shown positioned between said layers 76 and 78 and adjacent said image areas 82. The construction of the composite film illustrated in Fig. 4 is such that upon applications of compression commencing at lower extremities of container 84 and moving progressively upward, the fluid in said container is ejected between frangible portions 86 thereof and is spread between unbonded layer portions 82 as above described. Raised or beaded portions 88 of the film extending longitudinally thereof adjacent said marginal portions 80 provide a construction whereby, when a plurality of film units are loaded in magazine 36 of Fig. 1, the compressive force of spring 70 is transmitted from one unit to another through said beaded portions only, no part of said force being borne by fluid container 84 lying therebetween, and said construction thus obviating the possibility of inadvertent collapse of the container and release of the fluid within the magazine. It will be obvious that other means may be employed for preventing undesirable subjection to pressure of the liquid container while said film is loaded in the magazine, said means comprising modifications of the film per se, or means associated with the magazine for separating film units while positioned therein.

Referring to Fig. 1 and assuming film units 52 and 52a to be generally of the above-described type, each of said film units is to be regarded as correctly positioned in the camera with its transparent print-carrier layer nearest to framing plate 20 followed in order by the aforesaid photosensitive and base layers, respectively. The fluid-enclosing container, mounted between said print-carrier and photosensitive layers, is positioned at the lower portions of the film unit adjacent aperture 72. Upon actuating shutter release 14, the subject image is transmitted by said transparent print-carrier layer to the photosensitive layer and, accordingly, photographic exposure of said last-named layer is obtained.

After the above-described exposure of the photosensitive layer, the composite film may be subjected to processing for forming a positive print of the aforementioned subject image. Mechanism suitable for the purpose comprises pinion gears 90, handcrank 92, and cam elements 94 bearing roller members 96 (Figs. 1 and 3), said gears, handcrank, and cams being rigidly attached to one another and capable of being rotated together in a clockwise direction. Pinion gears 90 are engaged with gears 98, said last-named gears being coaxially mounted and joined with friction rollers 100, clockwise rotation of pinions 90 thus acting to drive said elements 98 and 100 in a counterclockwise direction. A pair of slots 102 in extended portion 20a of the framing plate permits entrance therethrough of the periphery of said friction rollers 100 and their positioning in frictional contact with marginal portions 88 of film unit 52a. The surfacing of friction rollers 100 may preferably be of a resilient, tacky composition adapted to positive engagement with said marginal portions of the film.

Pinion gears 90 are likewise engaged with gears 104, said last-named gears being mounted upon and rigidly attached to the shaft bearing pressure roller 106, said elements 104 and 106 being rotatable in a counterclockwise direction through clockwise rotation of handcrank 92. In turn, gears 104 engage with gears 108 (one gear 108 only being shown) said last-named gears being mounted upon and rigidly attached to the shaft bearing pressure roller 110, and said elements 108 and 110 being rotatable in a clockwise direction through the aforesaid clockwise rotation of handcrank 92. Gears 108 may be omitted in a modification of design and sufficient propulsive force applied to the film through pressure roller 106 alone. Although not shown, pressure rollers 106 and 110 may preferably be spring-loaded for imparting compressive force thereto, tension being applied to their respective axes in a plane intersecting said axes.

Gears 98 and associated friction rollers 100 are pivotally mounted by means of arms 112 having pivot pins 114 (one pin only being shown) whereby said friction rollers may either be caused to engage marginal portions of the film units as illustrated or may be pivotally displaced from said position of engagement therewith as will presently be shown. Engagement of friction rollers 100 with each film unit is principally induced through coil spring 116 attached, respectively, to extended portion 20a of the framing plate and to arm 112, said spring being formed for applying a predetermined tension to said arm. It will be noted that at the position of engagement of friction rollers and film unit, as shown, roller members 96 of cams 94 are so placed, through the rotative position of said cams, as to be barely in contact with or slightly spaced from arms 112 and that said roller members in the aforesaid position exert no influence upon the pivotally adjustable position of said arms 112. Upon completing a sufficient clockwise rotation of cams 94, it is apparent that roller members 96 will be brought into contact with lower edge portions of arms 112, said lower edges being positioned to intercept arcs described by said rollers when the rollers are brought adjacent said lower edge portions of arms 112. The rollers, in describing said arcs, apply thrust to said arm portions, cause the pivotally mounted arms to move substantially upward and to the right and, accordingly, provide disengagement of gears 98 from gears 90 and disengagement of friction rollers 100 from film unit 52a.

A lever element 117, having pivotal mounting 118, indented portion 120, and depressible handle portion 122 extending through a light-shielded slot 124, formed in the camera housing substantially at right angles to the axis of said handle, is positioned for coactive operation with arm 112. An edge portion of lever 117 is held in contact with a pin 126 extending forwardly from a surface of said arm 112 through tension applied by a coil spring 128 attached to said lever 117 and to the camera casing. When arm 112 is pivotally rotated as hereinbefore described, pin 126 is caused to move along said edge of lever 117 and to enter indented portion 120 thereof, thus substantially locking the arm and lever together and, more particularly, thereby holding friction rollers 100 out of engagement with film unit 52a. Said spacing of the friction rollers from the film is maintained until lever handle 122 is depressed, thereby withdrawing indentation 120 from pin 126 and permitting arms 112 to rotate in a counterclockwise direction provided cam rollers 96 are at a nonoperative rotative position relative to said arms as hereinbefore described.

In operation the aforementioned elements function as follows: Film unit 52a is photographically exposed through actuation of shutter release 14. Handcrank 92 is rotated in a clockwise direction causing counterclockwise rotation of friction rollers 100 and, accordingly, film unit 52a is propelled through aperture 72. The film unit is then engaged and subjected to propulsion and compression by pressure rollers 106 and 110, rotating in counterclockwise and clockwise directions, respectively. After engagement of said pressure rollers and film unit, roller elements 96 have been rotated to the aforesaid position whereby thrust is applied by said rollers to arms 112, thus breaking engagement of friction rollers 100 and the film unit. Said terminated engagement of the friction rollers and film unit is maintained until lever handle 122 is depressed as hereinbefore described. Continued rotation of handcrank 92 causes pressure rollers 106 and 110 to propel and compress the entire film unit 52a therebetween. During that part of the propulsion cycle of said film unit when the trailing edge thereof has passed that portion of framing plate extension 20a which is substantially in the horizontal plane of the lower wall 36a of the magazine a succeeding film unit will be completely released from the magazine and brought to the framed position in which unit 52a is shown through the force applied by magazine compression spring 70 which tends to move all of the film units in the magazine toward said framing plate.

Figure 3:
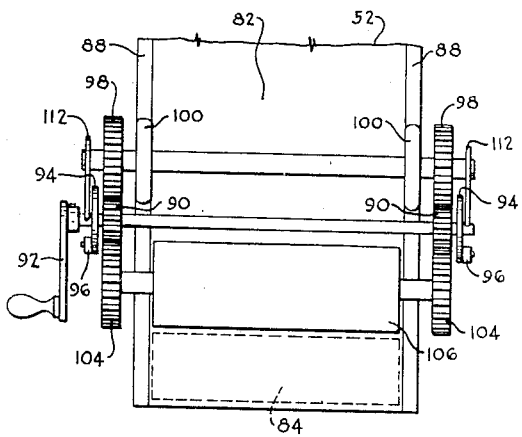

In passing between pressure rollers 106 and 110, as shown more clearly in Fig. 4, the film unit is subjected to progressive compressive stress, causing collapse of container 84, release of a photographic fluid contained therein, and spreading of said fluid over at least image portions 82 of said film unit including permeation of the photosensitive layer by said fluid. Said operations contribute to processing of the photosensitive layer of said film and formation of a positive photographic print of the subject image of said photographic exposure upon predetermined layer portions of said film. Fig. 4 also shows the construction of a suitable framing plate 20 wherein indented portions thereof receive projecting portions 88 of the film and prevent lateral displacement of said film when in framed position. Fig. 3, taken along the line 3—3 of Fig. 1 shows preferred gearing and shafting of propulsive and compressive means wherein it will be observed that said shafting extends transversely of the film unit, beyond both longitudinal edges thereof, and permits a duplication of the gearing, friction rollers, cams, cam rollers, and arms shown in Fig. 1, said constructions providing a more positive and evenly regulated propulsion and compression of the film unit. Fig. 3 also illustrates the position of pressure rollers (roller 106, only, being visible due to the showing in elevation) with respect to collapsed container 84 and image areas 82, it being assumed that a photographic fluid, released from said container, as previously described, is undergoing spreading between unbonded layer portions of the film unit comprising said image areas 82.

From the pressure rollers 106 and 110, the film unit is propelled through a transverse slot 130 (Fig. 1) formed in camera casing 22, said slot having a breadth and length slightly in excess of the thickness and width, respectively, of the film unit, said slot extending substantially across said casing 22 and lying in the plane of film travel. The film unit is propelled through the aforesaid slot and is passed into the chamber 132 through a complementary slot in the latter. Completion of movement of the film unit into chamber 132 is principally achieved by means of gravitational force and it will be seen that maintenance of said chamber in the position shown provides an angular arrangement of chamber casing elements whereby a plurality of said film units may be received and automatically arranged in successive order.

For the purpose of providing a compact camera for carrying or storage purposes, receiving or storage chamber 132 may be rotated on pivot element 134 to a mounting position next the camera casing providing a more compact apparatus as, for example, adjacent the front of the camera, after bellows portions 18 thereof have been compressed and locking latch elements 136 and 138 have been mutually engaged, said first-named latch element having depressible release means 140. The form of receiving chamber employed may comprise a generally rigid box-like construction or, as shown, may comprise two substantially rigid casing portions 142 and 144 formed from a sheet metal or other suitable opaque material, and bellows-like casing portions 146 forming a top and two side wall parts of said chamber As illustrated, two interconnected resilient lug members 148, preferably formed from a resilient metal, extend upwardly from and transversely across the top of said chamber 132, said members forming therebetween a slot-like aperture adapted to insertion in the aforementioned slot 130 formed in casing 22, said aperture being adapted to the passage therethrough of a film unit and lugs 148 serving as means contributive to the holding of said chamber in correct operative position for reception of film units. The lower enclosing portion of said chamber comprises means providing access to said chamber, namely, pivotally mounted door 150, pivotal means 152 therefor permitting inward or outward rotation of said door, and notch 154 formed adjacent an end portion of chamber casing 144, said notch being of suitable dimensions for receiving the extremity of said door and, accordingly, for retaining said door in closed position. Coil springs 156 and 158 attached to casing portions 142 and 144 adjacent both side wall portions 146 provide compressive force which is applied to the chamber and contributes both to hold said chamber substantially rigidly when in operative position and to maintain said chamber in a collapsed condition when it is pivoted to inoperative position, said door 150 pivoting inwardly against casing portion 142 when said chamber is collapsed. When chamber 132 is pivoted to inoperative position, means for closing aperture 130 are provided, said closure means comprising strip member 160 of suitable opaque material mounted for translational movement between channeled member 162 and casing 22.

When an exposed and processed film unit undergoing propulsion has passed beyond pressure rollers 106 and 110, said position thereof will be rendered obvious to the operator through termination of its frictional engagement with said rollers and accordingly by a lesser resistance to the rotation of handcrank 92. When said position of the film has thus become apparent, handcrank 92 is preferably to be stationed at the downward position shown in Fig. 1 thus automatically reestablishing a position of cam roller elements 96, suitably spaced from or in light contact with arms 112, thus permitting engagement of friction rollers 100 with a film unit in framed position. Upon establishment of a relationship of elements as above described, photographic exposure of the succeeding framed film unit may be performed. After said exposure, lever handle 122 may be depressed bringing friction roller 100 into engagement with marginal portions of said framed film unit and the handcrank may then be rotated for displacing said unit from framed position and for processing said unit as hereinbefore described.

It will be apparent that further modifications of camera apparatus may be made within the scope of the invention. Modified film propulsive means contemplates use of a backlash mechanism or a ratchet and pawl for obtaining the hereinbefore-described intermittent operations of friction rollers 100.

Although pressure rollers have been shown herein as a means for applying compression to the film material, it will be understood that other forms of compressing means may be employed such as one or more spring tension plates or squeegee elements, as where the film is advanced relative to said compressing means by separate advancing means.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. In a camera of a type comprising a main housing which includes means permitting the photographic exposure of a photosensitive film material, means for spreading a processing liquid between said film material and another sheet material, means providing a slot in said housing through which said film material and said sheet material may be ejected from said housing prior to completion of the processing thereof, the combination with said main housing means of auxiliary housing means, said auxiliary housing means comprising relatively rigid front and rear walls and collapsible side wall portions connecting said front and rear walls, means providing a slot in said auxiliary chamber, and means for movably mounting said auxiliary housing means with respect to said main housing means so that in one position of said auxiliary housing said slot then coacts with said slot in said main housing to provide a light-tight passage for the transfer of said processed film from said main housing to said auxiliary housing, said mounting means permitting said auxiliary chamber to assume another position wherein it may be collapsed and located with one of said rigid walls thereof adjacent a wall of said main housing.

2. In a camera of a type comprising a main housing which includes means permitting the photographic exposure of a photosensitive film material, means for spreading a processing liquid between said film material and another sheet material, means providing an aperture in said housing through which said film material and said sheet material may be ejected from said housing prior to completion of the processing thereof, the combination with said main housing of an auxiliary housing means comprising collapsible wall portions, said auxiliary housing means in its expanded position having an aperture in one wall thereof, and means for holding said auxiliary housing means in expanded position with the aperture therein positioned to coact with the aperture in said main housing so as to provide a passage through which the processed film may be ejected from said main housing into said auxiliary housing, said mounting means permitting said auxiliary housing to be collapsed and flattened against one wall of said main housing.

3. In a camera of a type comprising a main housing which includes means permitting the photographic exposure of a photosensitive film material, means for spreading a processing liquid between said film material and another sheet material, means providing an aperture in said housing through which said film material and said sheet material may be ejected from said housing prior to completion of the processing thereof, the combination with said main housing of an auxiliary housing means having an aperture formed in one of the walls thereof, said wall being of lesser planar area than at least one other of said walls, and means for movably mounting said auxiliary housing means with respect to said main housing means so that in one position of said auxiliary housing said apertures are in position to coact with one another to provide a passage for the transfer of film from said main housing to said auxiliary housing and in another position of said auxiliary housing said other wall being located adjacent to a wall of said main housing, thereby providing a more compart arrangement for said camera in its inoperative position.

4. In a camera of a type for exposing a photosensitive film material, for compressing it with another sheet-material during relative movement of the materials and a compressing means to spread a processing fluid between said materials, and for ejecting the compressed materials through an aperture formed in a casing portion thereof immediately contiguous said compressing means, the combination of means providing a chamber having an aperture formed therein for receiving the materials when they are ejected from the camera, said chamber serving to hold said materials while processing of the film is being completed, means for so attaching the chamber means to the camera casing as to permit said chamber means to assume a plurality of positions relative thereto, at one of said positions a given side of said chamber means being brought adjacent said camera casing and the aperture of said chamber means and aperture in said camera casing being placed adjacent one another to provide a passage for transfer of the compressed materials from the camera to the chamber means, and at a second of said positions another side of said chamber means being brought adjacent said camera casing to provide compactness of said camera and chamber means, and means for releasably holding said chamber means at each of said positions relative to said camera casing.

5. In a camera comprising a casing forming at least a chamber wherein a photosensitive film material may be photographically exposed, subjected to a processing treatment, and ejected through a slot formed in the casing immediately adjacent film-processing means of the camera, the combination of means providing a substantially oblong chamber having a slot formed therein for receiving the materials when they are ejected from the camera, said chamber serving to hold said materials while processing of the film is being completed, means for so attaching the chamber means to the camera casing as to permit said chamber means to assume a plurality of positions relative thereto, at one of said positions a given side of said chamber means being brought adjacent a given side of said camera casing and the slot of said chamber means and slot in said camera casing being placed adjacent one another to provide a continuous aperture for transfer of the compressed materials from the camera to the chamber means, and at a second of said positions another side of said chamber means being brought adjacent another side of said camera casing to provide compactness of said camera and chamber means, means for releasably holding said chamber means at each of said positions relative to said camera casing, and means providing access to said chamber means for removal of said materials therefrom.

6. In a camera comprising a casing forming at least a chamber wherein a photosensitive film material may be photographically exposed, subjected to a processing treatment, and ejected through an aperture formed in the casing, the combination of means providing a chamber having an aperture formed therein for receiving the materials when they are ejected from the camera, said chamber serving to hold said materials while processing of the film is being completed, means for so attaching the chamber means to the camera casing as to permit said chamber means to assume a plurality of positions relative thereto, at one of said positions said camera and chamber means being placed substantially end to end and the aperture of said chamber means and aperture in said camera casing being placed adjacent one another to provide a passage for transfer of the compressed materials from the camera to the chamber means, and at another of said positions said apertures being removed from one another and the camera and chamber means being placed side by side in contact with one another to provide compactness of said camera and chamber means, means for releasably holding said chamber means at each of said positions relative to said camera casing, and means providing access to said chamber means for removal of said materials therefrom.

7. In a camera of a type for exposing a photosensitive film material, for compressing it with another sheet material during relative movement of the materials and a compressing means to spread a processing fluid between said materials, and for ejecting the compressed materials through a slot formed in a casing portion thereof immediately contiguous said compressing means, the combination of means providing a chamber having a slot formed therein for receiving the materials when they are ejected from the camera, said chamber serving to hold said materials while processing of the film is being completed, means for so pivotally attaching the chamber means to the camera casing as to permit said chamber means to assume a plurality of positions relative thereto, at one of said positions a given side of said chamber means being brought adjacent said camera casing and the slot of said chamber means and slot in said camera casing being placed adjacent one another to provide a continuous aperture for transfer of the compressed materials from the camera to the chamber means, and at a second of said positions another side of said chamber means being brought adjacent said camera casing to provide a more compact arrangement of said camera and chamber means than is permitted at said first-named position thereof, latching and coupling means for releasably holding said chamber means at said positions relative to said camera casing, and means providing access to said chamber means for removal of said materials therefrom.

8. In a camera of a type for exposing a photosensitive film material, for compressing it with another sheet material during relative movement of the materials and a compressing means to spread a processing fluid between said materials, and for ejecting the compressed materials through an aperture formed in a casing portion thereof immediately contiguous said compressing means, the combination of means providing a collapsible chamber having an aperture formed therein for receiving the materials when they are ejected from the camera, said chamber in expanded condition serving to hold said materials while processing of the film is being completed, means for so attaching the chamber means to the camera casing as to permit said chamber means to assume a plurality of positions relative thereto, at one of said positions the chamber means being held in expanded condition and a given side of said chamber means being brought adjacent said camera casing so that the aperture of said chamber means and aperture in said camera casing are placed adjacent one another to provide a passage for transfer of the compressed materials from the camera to the chamber means, and at a second of said positions said chamber means being placed in collapsed condition and another side of said chamber means being brought adjacent said camera casing to provide a more compact arrangement of said chamber means and camera casing than is possible at said first-named relative position thereof, and means for releasably holding said chamber means at each of said positions relative to said camera casing.

9. In a camera of a type comprising bellows and lens means for exposing a photosensitive film material, means for compressing the exposed film material with another sheet material during relative movement of the materials and a compressing means to spread a processing fluid between said materials, and means for ejecting the compressed materials through a slot formed in a casing portion thereof immediately contiguous said compressing means, the combination of means providing a chamber having a slot formed therein for receiving the materials when they are ejected from the camera, said chamber serving to hold said materials while processing of the film is being completed, means for so attaching the chamber means to the camera casing as to enable said chamber means to assume a plurality of positions relative thereto, at one of said positions a given side of said chamber means being brought adjacent said camera casing and the slot of said chamber means and slot in said camera casing being placed adjacent one another to provide a continuous aperture for transfer of the compressed materials from the camera to the chamber means, and at a second of said positions another side of said chamber means being brought adjacent said camera casing to provide a closure for the front thereof after the bellows has been collapsed, said last-named position of the chamber means permitting a compactness of said chamber means and camera, and means for releasably holding said chamber means at each of said positions relative to said camera casing.

10. In a camera of a type for treating an assemblage of sheet materials comprising a photosensitive layer and another layer by exposing the photosensitive layer, by subjecting both layers to a compressing means to spread a processing fluid therebetween, and by ejecting the compressed materials through a slot formed in a casing portion of the camera positioned immediately contiguous the compressing means, the combination of means providing a substantially oblong chamber having a slot formed therein for receiving the materials when they are ejected from the camera, said chamber means providing a light-tight compartment for holding said materials while processing of the film is being completed, the relative position of the compressing means and the slots of the camera and chamber means, respectively, enabling said materials to travel substantially in a straight line from the compressing means to the interior of said chamber means, means for so attaching the chamber means to the camera casing as to permit said chamber means to assume a plurality of positions relative thereto, at one of said positions a given side of said chamber means being brought adjacent said camera casing and the slot of said chamber means and slot in said camera casing being placed adjacent one another to provide a continuous aperture for transfer of the compressed materials from the camera to the chamber means, and at a second of said positions another side of said chamber means being brought adjacent said camera casing to provide compactness of said camera and chamber means, and means for releasably holding said chamber means at each of said positions relative to said camera casing.

11. Apparatus for treating an assemblage of sheet materials comprising a photosensitive layer and another layer, said materials having a film-processing fluid releasably contained therebetween to provide a visible photographic image therein, said apparatus comprising, in combination, means for mounting a supply of said materials sufficient to provide a plurality of photosensitive areas adapted to exposure, means for successively positioning said photosensitive areas in a plane for exposure to actinic light, means for exposing said areas when thus positioned, rotatable means engaging said assembly for advancing said areas from exposure position after exposure thereof, means comprising a pair of compressing members adapted to apply a compression throughout successive fluid-bearing and exposed areas of said assemblage during advancement thereof to provide release and spreading of said fluid between said materials for effecting a permeation and processing of the exposed areas, casing means enclosing aforesaid apparatus, said casing means having an aperture formed therein for release of said sheet material assembly, and means comprising a light-tight chamber pivotally attached to said casing, said chamber having an aperture formed therein adapted to be releasably coupled with the aperture of said casing so that said assembly of materials, after compression, may be transferred from said casing to said chamber, said chamber being adapted to be pivoted to a second position relative to said casing, when not in use, for contributing to the compactness of said apparatus and improving the portability thereof.

12. In a camera comprising a casing forming at least a chamber wherein a photosensitive material may be photographically exposed, subjected to a processing treatment and ejected through an aperture formed in the casing, the combination therewith of means comprising a light-tight chamber, and means for pivotally attaching said chamber means to said casing, said chamber means having an aperture formed therein adapted to be releasably coupled with the aperture of said casing so that film material after processing may be transferred from said casing to said chamber means, said pivotal mounting means adapting said chamber means for pivotal movement to a second position relative to said casing when not in use for contributing to the compactness of said apertures and improving the portability thereof.

EDWIN H. LAND.

No references cited.

Certificate of Correction

Patent No. 2,467,320 April 12, 1949

EDWIN H. LAND

It is hereby certified that error appears in the printed specification of the above numbered patent requiring correction as follows:

Column 9, line 47, for "compart" read *compact*;

and that the said Letters Patent should be read with this correction therein that the same may conform to the record of the case in the Patent Office.

Signed and sealed this 30th day of May, A. D. 1950.

[SEAL]

THOMAS F. MURPHY,
*Assistant Commissioner of Patents.*